US008991299B2

(12) United States Patent
Gage et al.

(10) Patent No.: US 8,991,299 B2
(45) Date of Patent: Mar. 31, 2015

(54) REINFORCED THERMOPLASTIC ACTUATOR WITH WEAR RESISTANT PLASTIC LINER

(75) Inventors: Marc E. Gage, Feeding Hills, MA (US); Kevin M. Rankin, Windsor, CT (US); Noah M. Toth, Southbury, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 937 days.

(21) Appl. No.: 13/176,928

(22) Filed: Jul. 6, 2011

(65) Prior Publication Data

US 2013/0008306 A1 Jan. 10, 2013

(51) Int. Cl.

*F16J 10/04* (2006.01)
*B23P 11/00* (2006.01)
*F15B 15/14* (2006.01)

(52) U.S. Cl.

CPC ....... *F15B 15/1428* (2013.01); *F15B 2215/305* (2013.01)
USPC ..................... 92/170.1; 92/169.1; 29/888.061

(58) Field of Classification Search

USPC .................. 92/153, 155, 169.1, 170.1, 171.1; 29/888.061
See application file for complete search history.

(56) References Cited

U.S. PATENT DOCUMENTS

| | | | | |
|---|---|---|---|---|
| 4,685,384 A | | 8/1987 | Dirkin et al. | |
| 4,696,223 A | | 9/1987 | Link et al. | |
| 4,944,215 A | * | 7/1990 | Nimmo et al. | 92/170.1 |
| 5,014,603 A | * | 5/1991 | Navarette et al. | 92/169.1 |
| 5,209,804 A | | 5/1993 | Trudeau | |
| 5,435,868 A | | 7/1995 | Yu et al. | |
| 5,442,993 A | | 8/1995 | Baliotti, II et al. | |
| 5,799,543 A | | 9/1998 | Nagai et al. | |
| 6,755,025 B2 | | 6/2004 | Eleftheriou et al. | |
| 7,523,850 B2 | | 4/2009 | Barnes | |
| 7,897,265 B2 | | 3/2011 | Nardi et al. | |
| 2009/0255400 A1 | | 10/2009 | Fish | |

* cited by examiner

*Primary Examiner* — Michael Leslie
(74) *Attorney, Agent, or Firm* — Carlson, Gaskey & Olds, P.C.

(57) ABSTRACT

A fluid actuator includes a housing having a fluid chamber providing a first friction surface. An actuating member is arranged in the fluid chamber and has a second friction surface slideably engaging the first friction surface. The actuating member is configured to slide within the chamber between first and second positions. An insert is constructed from a first thermoplastic material and provides one of the first and second friction surfaces. A body structurally supports the insert and provides one of the housing or actuating member. The body is constructed from a second thermoplastic material molded about the insert and including short reinforcing fibers.

17 Claims, 2 Drawing Sheets

REINFORCED THERMOPLASTIC ACTUATOR WITH WEAR RESISTANT PLASTIC LINER

BACKGROUND

This disclosure relates to a fluid actuator, for example, for an aircraft. More particularly, the disclosure relates to a thermoplastic fluid actuator.

Typically, aluminum actuators have been used in the aerospace industry for a variety of fluid actuator applications, such as fueldraulic variable stator vane actuators. Aluminum actuators are rather costly. Composite actuators for non-aerospace hydraulic applications have been proposed.

One such actuator is provided by high strength reinforced composite liner forming the cylinder. The liner is wound with a resin impregnated fiber about its circumference to minimize diametrical expansion of the cylinder. However, many of the structural components of the actuator are still constructed from aluminum to provide the desired strength.

Similarly, composite piston rods have also been proposed for hydraulic actuators. The piston rod is constructed out of a metallic jacket with a polymer core. Again, a metallic structure still comprises a significant portion of the actuator.

SUMMARY

A fluid actuator includes a housing having a fluid chamber providing a first friction surface. An actuating member is arranged in the fluid chamber and has a second friction surface slideably engaging the first friction surface. The actuating member is configured to slide within the chamber between first and second positions. An insert is constructed from a first thermoplastic material and provides one of the first and second friction surfaces. A body structurally supports the insert and provides one of the housing and actuating member. The body is constructed from a second thermoplastic material molded about the insert and including short reinforcing fibers.

A method of manufacturing an actuator includes positioning an insert into a mold. The insert provides a friction surface and is constructed from a first thermoplastic material. A second thermoplastic material is injection molded about the insert to provide a body. A unitary actuator component is formed that includes the insert and the body.

BRIEF DESCRIPTION OF THE DRAWINGS

The disclosure can be further understood by reference to the following detailed description when considered in connection with the accompanying drawings wherein.

DETAILED DESCRIPTION

Figure 1:
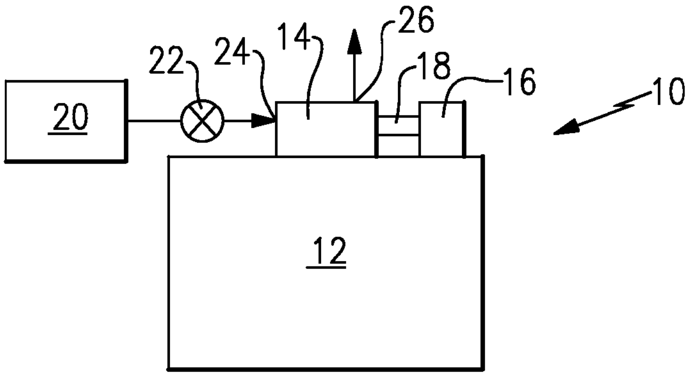
FIG. 1 is a highly schematic view of a hydraulic system.

A hydraulic control system 10 is schematically depicted in FIG. 1. The system 10 includes a component 12 having a subcomponent 16 controlled by an actuator 14. In one example, the component 12 is a gas turbine engine, and the subcomponent 16 is a variable stator vane system. The actuator 14 is connected to the subcomponent 16 by an actuating member 18, such as a rod, that is manipulated between multiple positions to control the subcomponent 16.

Regulated fluid is provided from a fluid source 20 through a control valve 22 to a first fluid port 24 of the actuator 14. Fluid exits the actuator 14 through a second fluid port 26. In the example, the actuator 14 is a fueldraulic actuator, and the fluid source 20 is a fuel tank. The fuel from the second fluid port 26 may be routed to a combustor, for example. It should be understood, however, that the system 10 illustrated in FIG. 1 is exemplary and the actuator 14 may be configured in a manner suitable for any given application.

Figure 2:
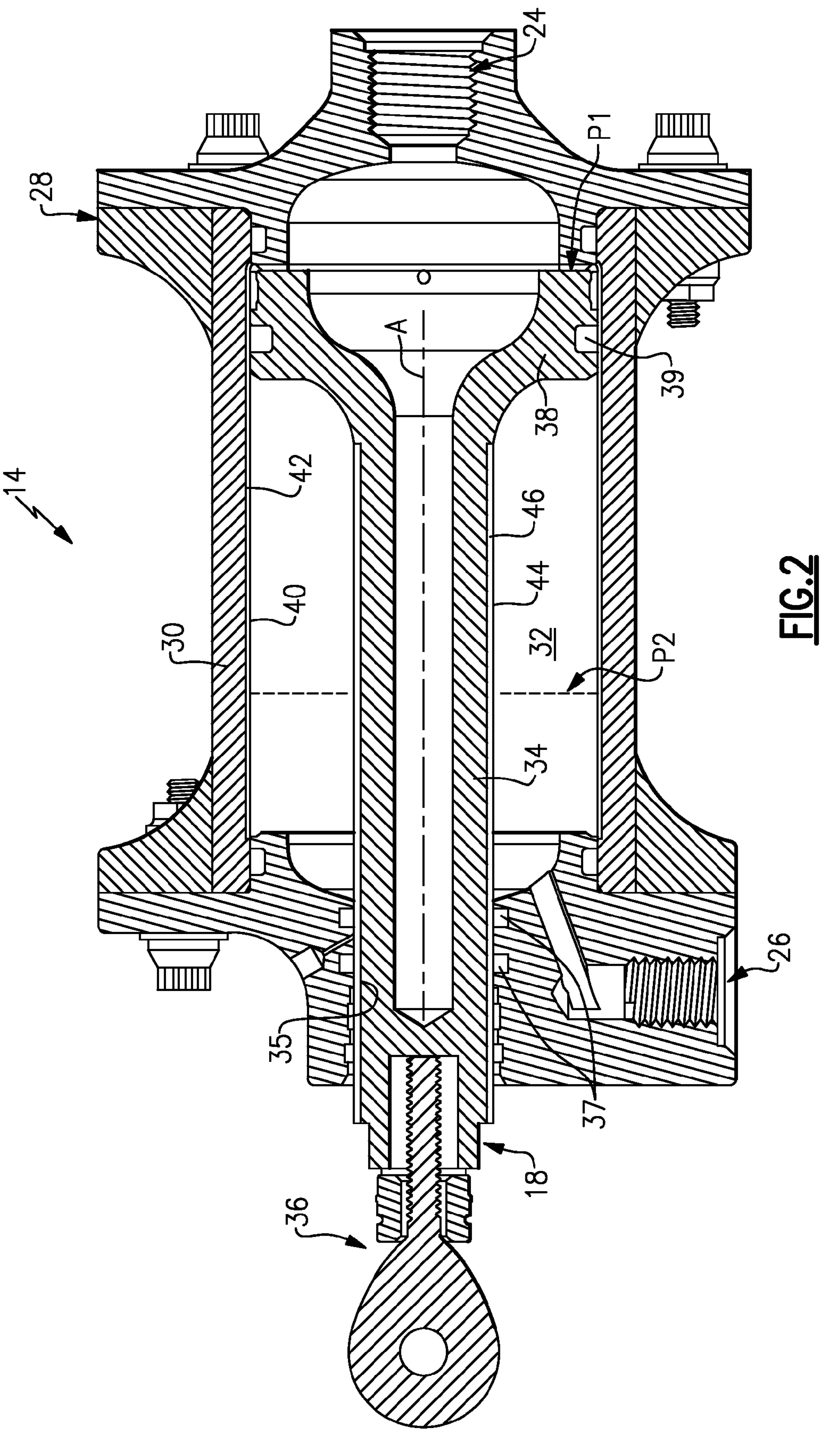
FIG. 2 is a cross-sectional view of an example fluid actuator.

Referring to FIG. 2, the actuator 14 includes a housing 28 having a cylinder 30. The cylinder 30 provides a chamber 32 within which the actuating member 18 is arranged. In the example, the actuating member 18 is provided by a rod 34 having an end 36 extending through a hole 35 in the cylinder 30 and a piston 38 arranged opposite the end 36. The piston 38 is moveable between first and second position P1, P2 along an axis A. Although a linear fluid actuator is illustrated, it should be understood that this disclosure may apply to other actuator configurations.

The example actuator 14 is constructed from a thermoplastic material. To ensure sufficient structural rigidity and to avoid component fatigue, the body of the cylinder 30 and rod 34/piston 38 in the example is constructed from a fiber reinforced thermoplastic, such as a polyamide imide, for example, TORLON 5030. The fiber reinforced thermoplastic is constructed from short reinforcing fibers, such as fiberglass or graphite to enable the body to be injection molded, which enables complex features of the actuator to be constructed from thermoplastic material thereby avoiding the use of many metallic structural components. "Short fibers" means fibers of a length less than the circumference of the diameter of the respective rod or piston. In one example, the fibers are chopped.

To avoid exposure to the fibers of the cylinder and/or rod body at the sliding surfaces of the actuator components, a cylinder insert 42 and a rod insert 46 are used to respectively provide cylinder and rod friction surfaces 40, 44. A seal 39 is carried by the piston 38 and engages the cylinder insert 42. Seals 39 are arranged in the hole 35 and engage the rod insert 46. The cylinder and rod inserts 42, 46 are constructed from a thermoplastic material that is different than the thermoplastic material of the body, for example non-abrasive, a non-fiber reinforced thermoplastic. However, non-abrasive fibers may be used to improve structural integrity, such as graphite fibers. In one example, the inserts are constructed from a polyamide imide, such as TORLON 4301. The insert thermoplastic material contains a lubricant, such as a polytetrafluoroethylene (PTFE) material, molybdenum disulfide, tungsten disulfide and/or graphite. One example of a suitable PTFE is TEFLON.

Figure 3:
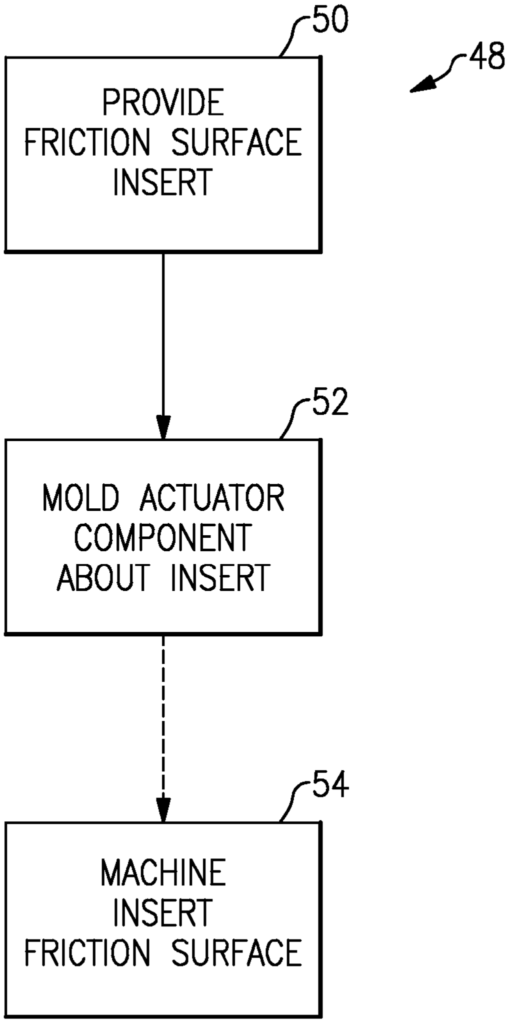
FIG. 3 is a flowchart depicting an example method of manufacturing an actuator.

A method 48 of constructing the actuator 14 is illustrated in FIG. 3. The method 48 includes the step of providing a friction surface insert, as indicated at block 50. In one example, the friction surface insert is constructed from a non-reinforced, lubricant-impregnated thermoplastic material. An actuator component body, such as a cylinder, rod and/or piston, is molded about the insert, as indicated at block 52. The body structurally supports and is adhered to the insert during molding providing a unitary actuator component. It may be desirable to machine the insert friction surface to provide a machined surface having more precise dimensional characteristics, as indicated at block 54.

Although an example embodiment has been disclosed, a worker of ordinary skill in this art would recognize that certain modifications would come within the scope of the claims. For that reason, the following claims should be studied to determine their true scope and content.

What is claimed is:

1. A fluid actuator comprising:

a housing having a fluid chamber providing a first friction surface;

an actuating member arranged in the fluid chamber and having a second friction surface slideably engaging the first friction surface, the actuating member configured to slide within the chamber between first and second positions; and an insert constructed from a first thermoplastic material and providing one of the first and second friction surfaces, and a body structurally supporting the insert and providing one of the housing and the actuating member, the body constructed from a second thermoplastic material adhered to the insert to provide a unitary actuator component, the body including short reinforcing fibers.

2. The fluid actuator according to claim 1, wherein the body provides a cylinder and the insert provides a cylinder friction surface.

3. The fluid actuator according to claim 1, wherein the body provides a rod and the insert provides a rod friction surface.

4. The fluid actuator according to claim 1, wherein the other of the housing and the actuator carry a seal engaging the one of the first and second friction surfaces.

5. The fluid actuator according to claim 1, wherein the actuator is a linear actuator in which the actuating member is translatable along an axis.

6. The fluid actuator according to claim 1, wherein the one of the first and second friction surfaces includes a machined surface slideably engaging the other of the first and second friction surfaces.

7. The fluid actuator according to claim 1, wherein the first and second thermoplastic materials are different than one another.

8. A fluid actuator comprising:

a housing having a fluid chamber providing a first friction surface;

an actuating member arranged in the fluid chamber and having a second friction surface Slideably engaging the first friction surface, the actuating member configured to slide within the chamber between first and second positions; and an insert constructed from a first thermoplastic material and providing one of the first and second friction surfaces, and a body structurally supporting the insert and providing one of the housing and the actuating member, the body constructed from a second thermoplastic material adhered to the insert and including short reinforcing fibers, wherein the first and second thermoplastic materials are constructed from a polyamide imide.

9. The fluid actuator according to claim 8, wherein the polyamide imide of the first thermoplastic material includes a lubricant-containing thermoplastic.

10. The fluid actuator according to claim 8, wherein the polyamide imide of the second thermoplastic material includes glass fibers.

11. A method of manufacturing an actuator comprising the steps of:

positioning an insert into a mold, the insert constructed from a first thermoplastic material;

injection molding a second thermoplastic material about the insert to provide a body; and forming a unitary actuator component including the insert and the body.

12. The method according to claim 11, comprising the step of machining the insert to provide a machined friction surface.

13. The method according to claim 11, wherein the second thermoplastic material includes chopped reinforcing fibers.

14. The method according to claim 11, wherein the unitary actuator component is one of a rod and a cylinder.

15. The method according to claim 7, wherein the first and second thermoplastic materials are constructed from a polyamide imide.

16. The method according to claim 8, wherein the polyamide imide of the first thermoplastic material includes a lubricant-containing thermoplastic.

17. The method according to claim 8, wherein the polyamide imide of the second thermoplastic material includes glass fibers.

* * * * *

UNITED STATES PATENT AND TRADEMARK OFFICE

CERTIFICATE OF CORRECTION

PATENT NO. : 8,991,299 B2
APPLICATION NO. : 13/176928
DATED : March 31, 2015
INVENTOR(S) : Marc E. Gage It is certified that error appears in the above-identified patent and that said Letters Patent is hereby corrected as shown below:

IN THE CLAIMS:

In claim 8, column 3, line 39; "Slideability" should read as --slideability--

Signed and Sealed this
Twenty-ninth Day of September, 2015

Michelle K. Lee
*Director of the United States Patent and Trademark Office*